No. 731,290.  
Patented June 16, 1903.

UNITED STATES PATENT OFFICE.

VIGGO DREWSEN, OF NEW YORK, N. Y.

PROCESS OF MANUFACTURING PRODUCTS FROM CORNSTALKS, SUGAR-CANE, &c.

SPECIFICATION forming part of Letters Patent No. 731,290, dated June 16, 1903.

Application filed April 13, 1903. Serial No. 152,321. (No specimens.)

*To all whom it may concern:*

Be it known that I, VIGGO DREWSEN, a citizen of the Kingdom of Norway, residing in the city of New York, county of Kings, and State of New York, have invented a new and useful Process of Manufacturing Products from Cornstalks, Sugar-Cane, and Analogous Pithy Stalks, of which the following is a specification.

The difficulty in preparing fibrous material (cellulose) or other products suitable for the manufacture of paper from these pithy stalks lies in the different character of the different parts of the stalk. A cornstalk proper, namely, without leaves or husks, for instance, consists of two parts, which can be used by paper-manufacturers—to wit, the outside shell and the pith. The shell has a character similar to wood and contains a high percentage of fibers, while the pith is spongy and consists principally of oblong cells. This is also true of the sugar-cane. The shell when treated with chemical substances, such as caustic soda or sulphurous acid and lime, yields a large proportion of fibers which are adapted for paper-making and produce an opaque sheet of paper. The pith, on the other hand, when treated with the same substances disintegrates into cells, and the sheet of paper derived therefrom is transparent and resembles imitation parchment-paper. The concentration of the chemicals necessary to disintegrate these different parts of the stalk differs very much. The shell requires a much stronger cooking liquor and must be cooked for a longer time than is required in cooking the pith. If, therefore, the cornstalk is cooked whole with the intention of producing fibers, the strength of the cooking liquor and the length of the cooking necessary for such purpose practically destroys the pith, which it is desirable to save, and this explains why the yield of paper-producing materials from the stalks is too small to make this process a commercial success.

It has been proposed to overcome this difficulty by separating the pith from the shell mechanically and then cooking them differently in caustic-soda solutions separately and subsequently uniting them in the proportions desired, and efficient machines have been devised for this purpose; but the mechanical separation before cooking has been found to involve considerable waste, owing to the impossibility of producing a complete separation by such means, and it is to obviate this waste, as well as to render such operation unnecessary, that my invention is designed.

I have discovered that I can separate the pith and shell and convert them into paper-making material in the following manner: I first split and cut up the entire stalk into pieces. I then place these pieces in a digester containing a solution so weak that only the pith becomes disintegrated and cook it for about, say, two hours, at a pressure of about sixty pounds per square inch. A solution of five pounds of caustic soda in seventy gallons of water is efficient, though I do not confine myself to this specific strength nor to the exact length of cooking specified. Of course the shell will also be partly cooked in this operation, but not sufficiently to disintegrate it into fibers. After cooking the pieces of stalk long enough to disintegrate the pith the pressure is blown off from the digester and the contents are run down into a draining-vat. The dark-colored liquor is allowed to run off and is washed out of the solid material and saved to be used for special purposes. The solid washed materials are then put through a scraping or raking machine that separates the cooked pith from the partly-cooked and hard shells and throws the two on a screen. The pith-cells pass through the meshes of the screen and are collected on a "wet-machine," as it is termed in the art. The partly-cooked shells are carried by traveling belts, aprons, or buckets to a second digester, in which they are again cooked in a stronger solution of cooking liquor, so as to produce the fibrous material from the shell portion. A suitable strength of this solution is about seven pounds of caustic soda to eleven gallons of water. The cooking may take about six hours at a pressure of about sixty pounds per square inch. I do not, however, confine myself to the specific strength of cooking liquor and length of cooking stated. The cooked fibrous material is now ready to be treated in the usual way, such as washing, beating, screening, &c., known to every pulp-producer. The cooked pith and the fibers from the shell may be afterward mixed in any desired proportions.

Having thus described my invention, what I claim is—

1. The process of manufacturing products from cornstalks, sugar-cane, and analogous pithy stalks which consists in, first, cooking the stalks in a disintegrating liquor of sufficient strength and for a sufficient time to disintegrate the pith only; second, separating the cooked pith of the shells; third, cooking the shells of the stalks in a disentegrating liquor of sufficient strength and for a sufficient time to disintegrate the shell into fibers, substantially as described.

2. The process of manufacturing products from cornstalks, sugar-cane, and analogous pithy stalks which consists in, first, slitting and dividing the stalks into pieces; second, cooking the pieces of stalks in a disintegrating liquor of sufficient strength and for a sufficient time to disintegrate the pith only; third, separating the cooked pith from the shells; fourth, cooking the shells of the stalks in a disintegrating liquor of sufficient strength and for a sufficient time to disintegrate the shells into fibers, substantially as described.

3. The process of manufacturing products from cornstalks, sugar-cane, and analogous pithy stalks which consists in, first, slitting and dividing the stalks into pieces; second, cooking the pieces of stalks in a solution of caustic soda of sufficient strength and for a sufficient time to disintegrate the pith only; third, separating the cooked pith from the shells; fourth, cooking the shells of the stalks in a solution of caustic soda of sufficient strength and for a sufficient time to disintegrate the shells into fibers, substantially as described.

VIGGO DREWSEN.

Witnesses:
J. E. HINDON HYDE,
EDMUND ELLSWORTH FIELD, Jr.